May 31, 1949. D. D. LOWBER ET AL 2,471,879
VERTICAL ILLUMINATOR
Filed Feb. 8, 1946 2 Sheets-Sheet 2
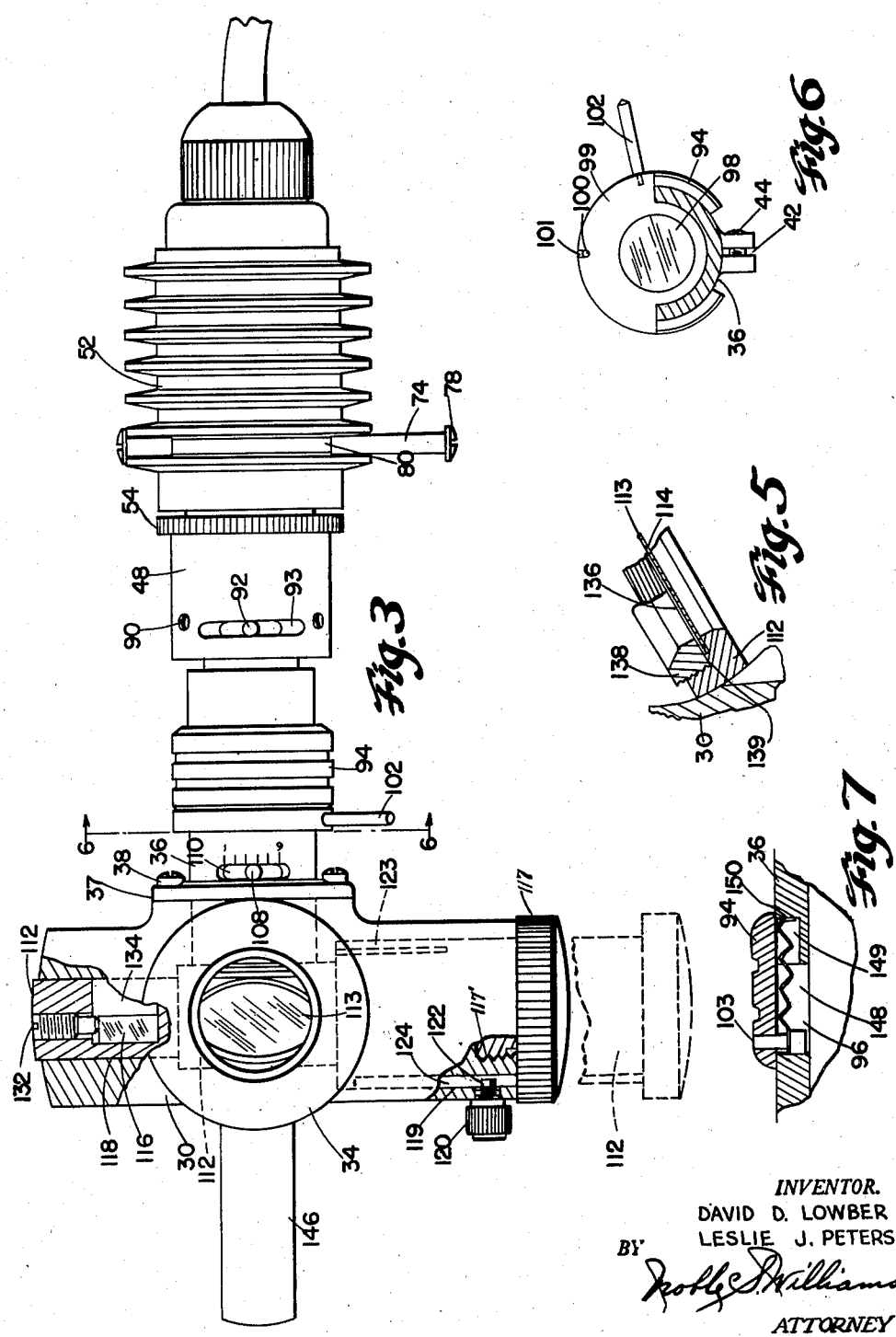
INVENTOR.
DAVID D. LOWBER
LESLIE J. PETERS
BY
ATTORNEY

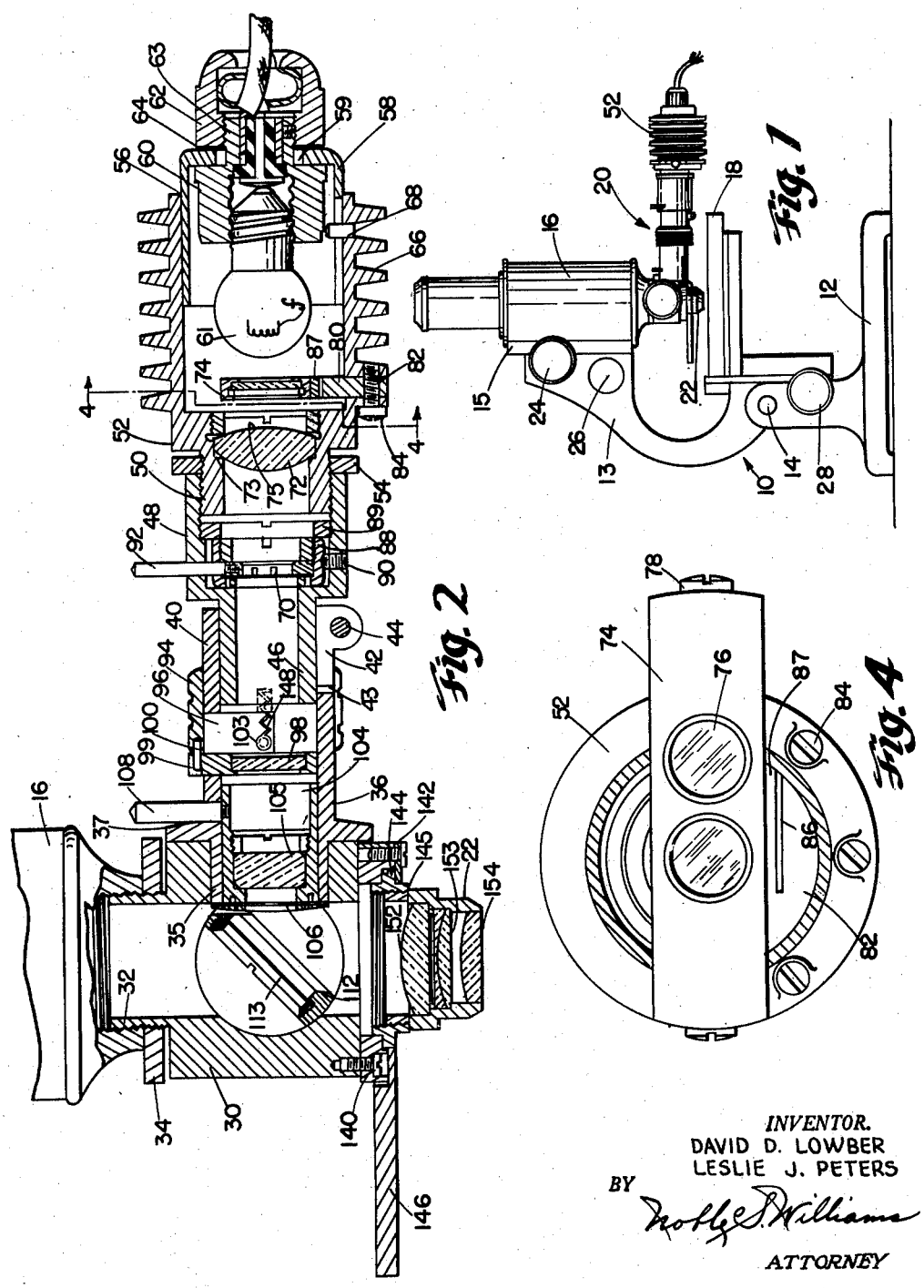

UNITED STATES PATENT OFFICE 2,471,879

VERTICAL ILLUMINATOR

David D. Lowber, Snyder, and Leslie J. Peters, Buffalo, N. Y., assignors to American Optical Company, Southbridge, Mass., a voluntary association of Massachusetts Application February 8, 1946, Serial No. 646,290

16 Claims. (Cl. 240—2)

This invention relates to microscopes and more particularly to illuminating means for microscopes being used for the observation and study of opaque or semi-opaque objects and the like.

Various devices and arrangements have been provided, heretofore, for use with microscopes for illuminating opaque objects and the like but each has been open to objections or limited in one way or another in providing the high degree of direct or vertical illumination desired for such microscopes.

It is, accordingly, an object of this invention to provide an improved compact self-contained vertical illuminator which may be easily and quickly attached to a conventional microscope when desired and employed therewith for the examination of opaque objects and the like. The illuminator of the invention is provided with a main hollow body portion adapted to be secured directly to and carried by the body tube supporting slide or the body tube of the microscope, an elongated and preferably horizontal extensible tubular arm secured to said body portion and a lamp housing adjustably secured to said tubular arm. The main body portion is provided with a horizontal bore and reflecting means or reflectors are positioned therein so as to be selectively located in optical alignment with the objective of the microscope for illuminating the object or specimen by light received from a light source in said lamp housing and projected downwardly through the objective. The several adjustable parts of the illuminator are so constructed and arranged that they remain in proper adjustment even though the microscope may be moved or tilted during use of the microscope.

In order to provide the improved illumination desired for varying conditions of use of the microscope, the illuminator is provided with a shiftable carrier positioned in said bore and arranged to support said reflecting means, which means comprises a semi-transparent mirror and a reflecting prism, so that the carrier may be selectively positioned to locate one or the other of these reflectors in alignment with the light source and the objective of the microscope. The optional use of one or the other of these reflectors depends primarily upon the particular objective being employed in the microscope and the type of illumination desired and, to function therewith, means in the form of an adjustable iris or aperture diaphragm is provided and located in close proximity to the operative position of said reflecting means for controlling the size of the beam of light being reflected thereby, thus allowing the light to be adjusted for best results with either reflector and each different objective used upon the microscope. The locating of this adjustable iris near the operative position of the reflector and the provision of an external control handle therefor allows either reflector to be used conveniently at its maximum efficiency with a minimum of stray light and haze in the eyepiece, such as might otherwise occur in the microscope if such iris were omitted therefrom or could not be readily adjusted by the operator during use of the microscope.

A novel means is employed for mounting one of the reflecting means upon the carrier so that no strain or distortion will be produced therein.

The vertical illuminator of the invention, furthermore, is provided with means for axially adjusting the light source in the lamp housing relative to a condenser lens system carried thereby, and also provided with means for adjusting said lamp housing and condenser lens system relative to an adjustable field iris or apertured diaphragm so that proper concentrating or converging of the light from said light source toward the aperture of this field iris may be had. This field iris is used in the illuminator for restricting the area of the specimen being illuminated so that it may correspond with the size of the field covered by the objective-eyepiece combination of the microscope, thus eliminating unnecessary glare and obtaining maximum contrast of parts of the specimen under observation.

Additional means is also provided for mounting the light source, comprising a conventional light bulb, so as to be laterally adjustable thus allowing the filament thereof to be properly positioned to compensate for variations in different makes of light bulbs as well as the slight differences in the positioning of the filaments of similar light bulbs as often occurs during the manufacture thereof. The tubular arm of the illuminator is made extensible so that the field iris may be properly imaged upon the specimen on the microscope stage even though the vertical illuminator may be employed with different microscopes having, for example, slightly different body tube lengths. The lamp housing is provided with convenient means for selectively positioning a plurality of diffusing plates of different light transmitting values in the path of the light so that different predetermined maximum illuminations may be provided, for example, when the illuminator is mounted upon a monocular microscope or when it is mounted for use upon a binocular microscope.

The vertical illuminator of the present invention is, furthermore, provided with means for allowing the positioning of a filter or other light-altering means in the path of the light directed toward the reflecting means and for retaining same in this position, said first mentioned means being also adapted to close the opening for said filter when the filter is removed from the device. The illuminator may thus be completely closed at all times during use so that there is no external stray light emitted therefrom to disturb the operator of the microscope.

Other objects and advantages of the invention will be apparent from a consideration of the following detail description taken in conjunction with the accompanying drawing, and it will be understood that many changes may be made in the construction and arrangement of the parts without departing from the scope of the invention as set forth in the appended claims.

Referring to the drawings:

Fig. 1 is a front elevational view of a microscope embodying the vertical illuminator of the invention;

Fig. 2 is a vertical cross sectional view of the illuminator of Fig. 1;

Fig. 3 is a plan view, partly in section, of the illuminator of the invention detached from the microscope;

Fig. 4 is a vertical transverse sectional view taken on line 4—4 of Fig. 2 and looking in the direction of the arrows;

Fig. 5 is an enlarged fragmentary view of a portion of Fig. 2;

Fig. 6 is a cross sectional view taken substantially upon line 6—6 of Fig. 3; and Fig. 7 is an enlarged fragmentary view showing preferred details of construction.

Referring to the drawings in detail and particularly Fig. 1, numeral 10 indicates generally a monocular microscope of conventional construction provided with a base 12, a supporting arm 13, an inclination joint 14, a body tube supporting slide 15, a microscope body tube 16 and an adjustable object or specimen supporting stage 18. Secured upon the lower portion of the body tube 16 is in the present instance a vertical illuminator indicated by the numeral 20 and carried thereby is a conventional objective 22. Obviously with certain types of microscopes the illuminator may be attached directly to the body tube supporting slide 15. It will be seen that a coarse adjustment 24 and fine adjustment 26 for the microscope tube and slide are provided upon the arm 13 and adjustment means 28 is provided for the stage 18 so that together these adjustments may be arranged to accommodate different objectives of varying size and power.

The vertical illuminator 20, as better shown by Fig. 2, comprises a main hollow body portion 30 provided with an upper threaded joint 32 and a locking washer 34 and is arranged to be secured and held in an operative position on the lower end of the microscope body tube 16. The body portion 30 is provided with an opening 35 at one side thereof into which is inserted an end of a horizontally extending tubular arm comprising a stationary tubular member 36 which is provided with a securing flange 37 held in place by conventional means such as screws 38 extending therethrough and threaded into the body portion 30. The outer end of the tubular arm 36 is provided with an end portion 40 which is longitudinally slotted as indicated at 42 and transversely slotted as indicated at 43 to form a resilient clamping ring portion, and a bolt or the like 44 is arranged to extend through openings therein so as to cause clamping engagement of end 46 of a movable tubular member 48. The opposite end of this movable tubular member 48 is somewhat larger and provided with internal threads to receive the threaded end position 50 of a lamp housing 52, and proper axial and angular adjustment between these threaded together members 48 and 52 is maintained by a locking collar 54.

In an opening 56 in the outer end of the lamp housing is positioned a cup-shaped member 58 which has provided in its outer end wall an opening 59 for loosely receiving the base portion of a lamp socket 60 supporting a light bulb 61. The socket may be adjustably held in proper position with the filament f of the light bulb 61 in axial alignment with the optical elements of the vertical illuminator by a clamping nut or collar 62 threaded onto the outer end 63 of the socket 60. When necessary, either when initially aligning the socket and bulb in the lamp housing or when replacing one bulb by another, the socket may be properly positioned by releasing the clamping collar 62 and shifting the socket to its correct position and then clamping these parts together. A spring washer 64 of conventional construction may be employed therewith to maintain the parts securely in place when once properly adjusted. A slot 66 provided in a side wall of the cup-shaped member 58 and a pin 68 carried by the lamp housing and extending into said slot allow the member 58 and thus the light source to be longitudinally adjusted for properly positioning of the light source relative to a condenser lens system comprising in the present instance a single lens 72. This lens system is positioned in a concentric recess 73 in the lamp housing for condensing light from the filament f and directing it toward the aperture of a field diaphragm or iris 70.

In order to give uniform diffusion of this light the surface 75 of this lens element 72 toward the light source 61 may be ground or acid etched as desired. Between the element 72 and the light source 61 is positioned a slide 74, see Fig. 4, carrying a plurality of diffusing plates 76 for producing different predetermined maximum illuminations for the illuminator. The slide 74 extends through the side walls of the housing 52 and may be shifted laterally in the housing as desired, stop members in the form of screws 78 being provided at the opposite ends of slide 74 for limiting the travel thereof. To allow placing of the slide 74 in the housing 52 in an easily and accurately formed guideway a slot 80 is provided, said slot extended from the lower portion of the housing upwardly approximately two thirds of the height of the housing to accommodate the slide, and the portion of the slot lying below the slide 74 is closed by a plate or insert 82 held in place by a plurality of screws 84 extending through this plate and threaded into the integral cooling flange portions of the lamp housing 52. A slot 86 in the plate 82 provides convenient means in the form of a resilient finger 87 for frictionally engaging the slide 74 and maintaining same in any adjusted position.

The field iris or diaphragm 70 referred to above is carried by a collar 88 securely held in position in the tubular member 48 by a retaining ring 89 which is screwed into position after centering screws or the like 90 in the tubular member 48 have been adjusted to properly center the iris in axial alignment in the vertical illuminator. The iris is of conventional construction and provided with a control arm 92 extending outwardly through a slot in collar 88 and a slot 93 in the tubular member 48 so that it may be conveniently moved laterally for varying the aperture of the diaphragm as desired during use of the microscope.

On the stationary tubular member 36 is carried a C-shaped slideable collar 94 and this collar is arranged when moved to an outer position to uncover a semi-circular opening 96 for receiving a filter or the like 98 carried in an adaptor 99, see Fig. 6, which may be slipped into said opening and into axial alignment in the illuminator, said collar being provided with a pin 100 adapted to engage in a small slot or opening 101 in the adaptor and thus retain same in proper position in the illuminator. The adaptor 99 is provided with an operating handle 102 to aid in placing the filter in its position in the illuminator and the pin 100 on the collar 94 is provided to prevent dislocation thereof should the handle 102 be accidentally struck by the operator while using or adjusting other parts of the microscope. A pair of pins 103 carried by the collar 94 engage the opposite edges of the slot 96 and serve to limit the extent of axial movement of the collar in either direction. While reference has been made above to a filter 98, it is obvious that various filters or different light-altering mediums of known characteristics may be carried by adaptors similar to the adaptor 99 for use in the illuminator or that a polarizing element may be so carried and used with a cap-analyzer positioned upon the eyepiece of the microscope.

The vertical illuminator of the invention further provides means for controlling the size and thus the intensity of the light beam being reflected onto the opaque object or the like and comprises a rotatable tubular member or sleeve 104 provided within the inner end of the stationary tubular arm 36. This tubular member 104 is arranged to support a compensating lens element 105 and adjacent thereto is an adjustable diaphragm or iris mechanism 106, said mechanism being connected to this tubular member 104 and the stationary tubular member 36 so that a handle 108 threaded into the member 104 and extending outwardly through a slot 110 in the member 36 may be moved laterally for varying the aperture of said iris 106. The handle 108 serves to prevent axial movement of the member 104 and thus the adaptor 99 may be positioned closely adjacent thereto without interference thereby. It will be seen that the positioning of this iris at the inner extremity of the stationary tubular member 36 eliminates to a maximum all haze and stray light which might otherwise occur in this part of the vertical illuminator.

Adjacent the inner end of the stationary tubular arm 36 and within the hollow body portion 30 is an angularly adjustable and laterally shiftable carrier 112. This carrier is adapted to support an optically flat transparent disc 113 having its opposite surfaces parallel, the lower surface being coated so as to form a semi-transparent mirror 114. The carrier 112 is also adapted to support a prism 116 in such a manner that said mirror and prism may be selectively moved to position one or the other, as desired, in axial alignment with the lens elements 72 and 105 as well as in optical alignment with the objective of the microscope. The carrier 112 is provided with a handle portion 117 so that the carrier may be conveniently moved outwardly from a position in which said semi-transparent mirror 114 is in optical alignment with the objective 22 to a second position as shown by dotted lines in Fig. 3 in which the prism 116 is similarly aligned with the objective of the microscope. The handle 117 is screwed into one end of the carrier 112 as indicated at 117'.

The carrier 112 has one cylindrical end portion positioned to slide and rotate in a horizontal bore 118 in the housing 30 and its opposite cylindrical end portion similarly positioned in a larger bore 119 in said housing. A stop member 120 is threaded into the last mentioned end of the housing 30 and has a finger 122 arranged to engage in a slot 124 provided in the outer surface of the carrier 112 for properly guiding and limiting the travel of the carrier 112 while being shifted laterally. A resilient finger 123 formed by a saw cut in the larger cylindrical end of the carrier 112 and sprung outwardly slightly serves as convenient means for frictionally holding the carrier in any adjusted position. When the carrier 112 has been angularly rotated to a proper position relative to the portion 30 and secured by means of the finger 122 this finger serves to hold the carrier in approximately the proper angular position relative to the housing 30 so that the semi-transparent mirror 114 and prism 116 carried thereby will be held in proper relation to the source of illumination to illuminate the opaque object or specimen under examination. Sufficient clearance is provided between the finger 122 and the sides of the slot 124 to allow limited angular adjustment of the carrier for aligning the reflecting means in the optical system. When the stop member 120 is removed from the body portion 30 the carrier may be slipped out of the body portion 30 for cleaning purposes or the like. A set screw 132 is provided in the end of the carrier opposite the handle 117 and serves to retain the prism 116 in its proper predetermined position in a recess 134 in the carrier 112. The prism may also be cemented in place in the recess 134 if desired. The disc 113 having a semi-transparent mirror coating 114, applied to its lower surface, see Fig. 5, is positioned in an annular recess 136 of slightly greater diameter in the carrier and sufficient clearance is allowed between the carrier and a retaining ring 138 so that no distortion or stress will be produced in the disc when the retaining ring 138 is screwed into assembled position against a shoulder 139, thus retaining the disc 113 with very slight clearance in place in said annular recess.

A ring shaped adaptor 140 is provided at and secured to the lower end of the body portion 30 for receiving a semi-circular resilient retaining member 142 of known construction which is screwed to the lower surface of the adaptor 140 and together these members serve to engage a flanged portion 144 of a quick change nosepiece 145 which is internally threaded to receive the objective 22 and retain same in proper position. An integral arm or handle 146 extends outwardly from the quick change nosepiece and serves as convenient means for facilitating the placing of the objective carried thereby upon the microscope or its removal therefrom.

As stated above it is desirable to have the field stop or iris diaphragm 70 so positioned in the illuminator that it will always be imaged at the plane of the specimen or object when the microscope is focused upon the specimen or object, When such is the case, the field stop or iris will then be re-imaged by the optical elements of the microscope at the plane of the eyepiece thereof. Without the compensating lens 105 in place in the illuminator, it would be necessary to locate this field stop or iris outwardly from the point of intersection of the axes of the microscope and the illuminator a distance equal to the distance from said point to the plane of the eyepiece of the instrument in order to obtain the re-imaging of diaphragm 70 in the manner just described. The compensating lens 105, however, is of such optical design and so located in the illuminator that the virtual image of the field stop 70 will be located at such a distance from said point of intersection when the field stop 70 is in reality located materially closer to said point of intersection, as clearly indicated by the drawings. The compensating lens also serves together with the condensing lens system 72 to image the light source approximately at the plane of the aperture stop or iris diaphragm 106. Material advantages of the use of the compensating lens 105 are that objectives may be readily interchanged without disturbing the proper imaging of the field stop and also the overall length of the illuminator can be materially reduced.

When and if desired a pair of diametrically opposed compression springs 148 may be employed for returning the C-shaped collar 94 to its innermost position either to close the opening 96 or to bear against the adaptor 99 as shown by Fig. 3. As shown best by Fig. 7 the inner end of each of these springs is formed with a looped portion to encircle and engage in a groove formed therefore in the associated pin 103 carried by the collar 94. The opposite end of each spring is arranged to extend into a recess 149 easily formed in the outer surface of the member 36 and to bear against the end wall 150. Since the springs 148 are under compression at all times they serve to continually urge the collar 94 toward a closing position.

Lens elements such as 152, 153 and 154 may be employed in the objective 22 and the surfaces of these elements as well as the upper surface of the disc 113 may each be treated with a non-reflective film or coating such as disclosed by the Cartright Patent #2,207,656. This film when used serves to greatly eliminate glare produced in the eyepiece of the microscope by the surfaces of the objective lenses and the upper surface of the disc 113 and greatly improve contrast in the visual image of the opaque object or specimen under observation.

From the above it will be seen that we have provided simple, efficient and economical means for obtaining all of the advantages of the invention as set forth above:

Having described the invention we claim:

1. An illuminator for use with a microscope of the character described and having an adjustable slide and body tube, said illuminator having a body portion adapted to be detachably carried thereby and adapted to receive an objective lens system detachably secured to said body portion in optical alignment with said body tube, a tubular arm carried by said body portion, said arm comprising a stationary tubular part and a movable tubular part, a lamp housing carried by said movable part and containing a light bulb and condenser lens system therein, an apertured diaphragm carried by said movable tubular part, said light bulb being axially adjustable relative to said housing and condenser lens system, and said housing being axially adjustable relative to said movable tubular part for converging the light from said bulb toward the aperture of said diaphragm, and a reflector in said body portion for directing light from said light bulb through said objective and onto a specimen positioned for observation through said microscope, said movable tubular part being axially adjustable to allow imaging of said diaphragm at the plane of said specimen.

2. An illuminator for use with a microscope of the character described and having an adjustable slide and body tube, said illuminator having a body portion adapted to be detachably carried thereby and adapted to receive an objective secured to said body portion in optical alignment with said body tube, a tubular arm carried by said body portion, said arm comprising a stationary tubular part and a movable tubular part, a lamp housing carried by said movable tubular part and containing a light bulb and condenser lens system therein, an adjustable member carried by said housing and supporting a diffusing element in said lamp housing so that it may be optionally located in a position between said light bulb and condenser lens system or located in a second position laterally disposed relatively thereto, an apertured diaphragm carried by said movable tubular part, said light bulb being axially adjustable relative to said housing and condenser lens system, and said housing being axially adjustable relative to said movable tubular part for converging the light from the said bulb toward the aperture of said diaphragm, and a reflector in said body portion for directing light from said light bulb through said objective and onto a specimen positioned for observation through the microscope, said movable tubular part being axially adjustable to allow imaging of said diaphragm at the plane of said specimen.

3. An illuminator for use with a microscope of the character described and having an adjustable slide and body tube, said illuminator having a body portion adapted to be detachably carried thereby and adapted to receive an objective secured to said body portion in optical alignment with said body tube, a tubular arm carried by said body portion, said arm comprising a stationary tubular part and a movable tubular part, a lamp housing carried by said movable part and containing a light bulb and condenser lens system therein, an adjustable member carried by said housing and supporting a diffusing element in said lamp housing so that it may be optionally located in a position between said light bulb and condenser lens system or located in a second position laterally disposed relatively thereto, resilient means between said adjustable member and said housing for frictionally holding said adjustable member in any adjusted position, an apertured diaphragm carried by said movable tubular part, said light bulb being axially adjustable relative to said housing and condenser lens system, and said housing being axially adjustable relative to said movable tubular part for converging the light from the said bulb toward the aperture of said diaphragm, and a reflector in said body portion for directing light from said light bulb through said objective and onto a specimen positioned for observation through the microscope, said movable tubular part being axially adjustable to allow imaging of said diaphragm at the plane of said specimen.

4. An illuminator for use with a microscope of the character described and having an adjustable slide and body tube, said illuminator comprising a body portion adapted to be detachably carried thereby and adapted to receive an objective secured to said body portion in optical alignment with said body tube, a tubular arm carried by said body portion, said arm comprising a stationary tubular part and a movable tubular part, a lamp housing carried by said movable part and containing a light bulb and condenser lens system therein, an iris diaphragm carried by said movable tubular part, said light bulb being axially adjustable relative to said housing and condenser lens system, and said housing being axially adjustable relative to said movable tubular part for converging the light from said bulb toward the aperture of said diaphragm, a second iris diaphragm at the inner end of said stationary tubular part, and a reflector in said body portion for directing light from said light bulb through said objective and onto a specimen being observed through the microscope, said second diaphragm being located closely adjacently said reflector and adjustable for controlling the amount of light passing therethrough, said movable tubular part being axially adjustable to allow imaging of said first diaphragm at the plane of said specimen.

5. An illuminator for use with a microscope of the character described and having an adjustable slide and body tube, said illuminator comprising a body portion adapted to be detachably carried thereby and adapted to receive an objective lens system detachably secured to said body portion in optical alignment with said body tube, a tubular arm carried by said body portion, said arm comprising a stationary tubular part and a movable tubular part, a lamp housing carried by said movable tubular part and containing a light bulb and condenser lens system therein, an apertured diaphragm carried by said movable tubular part, said light bulb being axially adjustable relative to said housing and condenser lens system, and said housing being axially adjustable relative to said movable tubular part for converging the light from said bulb toward the aperture of said diaphragm, a reflector in said body portion for directing light from said light bulb through said objective and onto a specimen positioned for observation through said microscope, a rotatable sleeve in said stationary tubular part and a control arm therefor extending outwardly through a slot in said stationary tubular part, a second diaphragm adjacent the inner end of said stationary tubular part and adjacent said reflector, said rotatable sleeve being operatively connected to the said second diaphragm for operating same, and a compensating lens system within said sleeve and adjacent said second diaphragm, said movable tubular part being axially adjustable to allow imaging of said first diaphragm at the plane of said specimen.

6. An illuminator for use with a microscope of the character described and having an adjustable slide and body tube, said illuminator comprising a body portion adapted to be detachably carried thereby and adapted to receive an objective secured to said body portion in optical alignment with said body tube, a tubular arm carried by said body portion, said arm comprising a stationary tubular part and a movable tubular part, a lamp housing carried by said movable tubular part and containing a light bulb and condenser lens system therein, an iris diaphragm carried by said movable tubular part, said light bulb being axially adjustable relative to said housing and condenser lens system, and said housing being axially adjustable relative to said movable tubular part for converging the light from said bulb toward the aperture of said diaphragm, a reflector in said body portion for directing light from said light bulb through said objective and onto a specimen positioned for observation through the microscope, said movable tubular part being axially adjustable to allow imaging of said diaphragm at the plane of said specimen, a slot in said stationary tubular part adapted to receive an adaptor containing a light-altering element and retain same in the path of the light passing through said diaphragm, and a shiftable collar carried by said stationary tubular part and having means thereon for engagement with said adaptor and retaining same in operative position, said collar also being adapted to close said slot when the adaptor is removed from said illuminator.

7. An illuminator for use with a microscope of the character described and having an adjustable slide and body tube, said illuminator comprising a body portion adapted to be detachably carried thereby and adapted to receive an objective secured to said body portion in optical alignment with said body tube, a tubular arm carried by said body portion, said arm comprising a stationary tubular part and a movable tubular part, a lamp housing carried by said movable tubular part and containing a light bulb and condenser lens system therein, an apertured diaphragm carried by said movable tubular part, said light bulb being supported within said housing by suitable means allowing lateral adjustment thereof for axial alignment of the filament thereof with said condenser lens system, said apertured diaphragm being adjustably supported in said movable tubular part by a mounting ring and set screws threaded through said movable tubular part for axially aligning said diaphragm in said illuminator, said light bulb also being axially adjustable relative to said housing and condenser lens system, and said housing being axially adjustable relative to said movable tubular part for converging the light from said bulb toward the aperture of said diaphragm, and a reflector in said body portion for directing light from said light bulb onto a specimen positioned for observation through said microscope, said movable tubular part being axially adjustable for allowing imaging of said diaphragm at the plane of said specimen.

8. An illuminator for use with a microscope of the character described and having an adjustable slide and body tube, said illuminator comprising a body portion adapted to be detachably secured thereto and to detachably receive and retain an objective thereon, a support positioned in said body portion and having a relatively large aperture formed therein, an annular flange on said support and surrounding said aperture, an annular shoulder concentric therewith and spaced outwardly thereof, an annular retaining ring threaded into said support so as to be concentric with said flange and abut said shoulder, the adjacent annular surfaces of said ring and flange being so spaced by said shoulder when assembled as to form an annular recess therebetween, and a disc-shaped reflector positioned in said recess and retained therein by said ring and flange, said reflector being of such a diameter and thickness as to fit loosely within said recess and without being gripped by any of the opposed surfaces defining said recess.

9. An illuminator for use with a microscope of the character described and having an adjustable slide and body tube, said illuminator comprising a body portion adapted to be detachably carried thereby and adapted to receive an objective secured thereto in optical alignment with said body tube, a tubular arm carried by said body portion, said arm comprising a stationary tubular part and a movable tubular part, a lamp housing carried by said movable tubular part and containing a light bulb and condenser lens system therein, a first apertured diaphragm carried by said movable tubular part, said light bulb being axially adjustable relative to said housing and condenser lens system, and said housing being axially adjustable relative to said movable tubular part for converging the light from said bulb toward the aperture of said first diaphragm, reflector means in said body portion for directing light from said light bulb through said objective and onto a specimen positioned for observation through the microscope, a rotatable sleeve in said stationary tubular part, a control handle for said rotatable sleeve extending outwardly through a slot in said stationary tubular part for controlling the operation of said sleeve, a second apertured diaphragm positioned adjacent said reflector means, said second diaphragm being operatively connected to said rotatable sleeve and said stationary tubular part, a laterally shiftable carrier positioned in a bore in said body portion, said reflector means comprising a semi-transparent mirror and a reflecting prism positioned at laterally spaced locations on said shiftable carrier, said carrier being movable for positioning said mirror or said prism in alignment with the light from said light bulb and angularly disposed for directing said light through said objective and onto said specimen, said second diaphragm being adjustable for controlling the amount of light being directed upon said mirror or prism from said light bulb, and said movable tubular part being axially adjustable to allow imaging of said first diaphragm at the plane of said specimen.

10. An illuminator for use with a microscope of the character described and comprising an adjustable slide and body tube, said illuminator comprising a hollow body portion adapted to be detachably carried thereby and adapted to receive an objective secured thereto, a tubular arm carried by said body portion and supporting a light diffusing element upon an outer portion thereof, reflecting means in said hollow body portion for directing light from said diffusing element through said objective and onto a specimen positioned for observation through the microscope, a rotatable sleeve positioned in said tubular arm, an iris diaphragm positioned closely adjacent said reflecting means, said iris diaphragm being operatively connected to said tubular arm and said rotatable sleeve so as to be adjusted by rotation of said sleeve, a laterally shiftable carrier positioned in said hollow body portion and carrying said reflecting means, said reflecting means comprising a semi-transparent mirror and a reflecting prism positioned at laterally spaced locations on said carrier and movable therewith for selectively positioning said mirror or said prism in alignment with the light from said diffusing element and said objective, and a control handle for rotating said sleeve extending outwardly through a transverse slot in said tubular arm, whereby the iris diaphragm of said illuminator may be readily adjusted to give different illumination to the specimen as desired in accordance with the particular objective and reflecting means being employed therewith.

11. An illuminator for use with a microscope of the character described and comprising an adjustable slide and body tube, said illuminator comprising a hollow body portion adapted to be detachably carried thereby and adapted to receive an objective secured thereto, a tubular arm carried by said body portion and supporting a light diffusing element upon an outer portion thereof, reflecting means in said hollow body portion for directing light from said diffusing element through said objective and onto a specimen positioned for observation through the microscope, a rotatable sleeve positioned in said tubular arm, an iris diaphragm positioned closely adjacent said reflecting means, said iris diaphragm being operatively connected to said tubular arm and said rotatable sleeve so as to be adjusted by rotation of said sleeve, a laterally shiftable carrier positioned in said hollow body portion and carrying said reflecting means, said reflecting means comprising a semi-transparent mirror and a reflecting prism positioned at laterally spaced locations on said carrier and being movable therewith for selectively positioning said mirror or said prism in alignment with the light from said diffusing element and said objective, a control handle for rotating said sleeve extending outwardly through a transverse slot in said tubular arm, said arm serving to prevent movement of said sleeve axially of said tubular arm, a second slot formed in said tubular arm adapted to receive an adaptor supporting a light-altering medium positioned in said second slot so as to lie adjacent and axially outwardly of said rotatable sleeve, a slidable collar partially encircled by said tubular arm and means on said sleeve for retaining said adaptor in place in the illuminator, whereby the iris diaphragm of said illuminator may be readily adjusted in accordance with the particular objective and reflecting means being employed therewith without accidental dislocation of said adaptor.

12. An illuminator for use with a microscope of the character described and comprising an adjustable slide and body tube, said illuminator comprising a hollow body portion adapted to be detachably carried thereby and adapted to receive an objective secured thereto, a tubular arm carried by said body portion and supporting a light diffusing element upon an outer portion thereof, reflecting means in said hollow body portion for directing light from said diffusing element through said objective and onto a specimen positioned for observation through the microscope, a rotatable sleeve positioned in said tubular arm, an iris diaphragm positioned closely adjacent said reflecting means, said iris diaphragm being operatively connected to said tubular arm and said rotatable sleeve so as to be adjusted by rotation of said sleeve, a laterally shiftable carrier positioned in said hollow body portion and carrying said reflecting means, a resilient finger formed on said carrier and adapted to frictionally engage the interior surface of said hollow body portion, said reflecting means comprising a semi-transparent mirror and a reflecting prism positioned at laterally spaced locations on said carrier and movable therewith for selectively positioning said mirror or said prism in alignment with the light from said diffusing element and said objective, and a control handle for rotating said sleeve extending outwardly through a transverse slot in said tubular arm, whereby the iris diaphragm of said illuminator may be readily adjusted to give different illumination to the specimen as desired in accordance with the particular objective and reflecting means being employed therewith.

13. An illuminator for use with a microscope of the character described and having an adjustable slide and body tube, said illuminator comprising a body portion adapted to be detachably secured thereto and to detachably receive and retain an objective thereon, a reflector positioned for use in the optical system of said microscope, said reflector comprising a relatively thin plate-like member having optically flat parallel opposed surfaces, and a support positioned in said body portion and having separable parts for receiving and retaining said reflector in position in said optical system, said parts when in assembled relation having sufficient clearance for said reflector so as to loosely mount and retain same in said system without being gripped or stressed by said parts, whereby distortion of the relatively thin flat plate-like reflector is avoided.

14. An illuminator for use with a microscope of the character described and having a body tube, said illuminator having a body portion adapted to be detachably carried by said body tube and adapted to detachably receive and support an objective lens system in optical alignment with said body tube, an extensible supporting arm carried by said body portion and comprising a stationary hollow part and a movable hollow part, a lamp housing carried by said movable hollow part and containing a light bulb and a condenser lens system therein, adjustable light control means within said movable hollow part for controlling the size of the light beam passing therethrough, said housing being axially adjustable relative to said movable hollow part for concentrating the light from said bulb toward said light control means, and reflecting means in said body portion for directing the light beam passing said light control means through said objective and onto an object or specimen positioned for observation through said microscope, said movable hollow part being axially adjustable relative to said stationary hollow part to allow said light control means to be imaged at the plane of said object when said microscope is focused upon said object.

15. An illuminator for use with a microscope of the character described and having a body tube, said illuminator having a body portion adapted to be detachably carried by said body tube and adapted to detachably receive and support an objective lens system in optical alignment with said body tube, an extensible supporting arm carried by said body portion and comprising a stationary hollow part and a movable hollow part, a lamp housing carried by said movable hollow part and containing a light bulb and a condenser lens system therein, adjustable light control means within said movable hollow part for controlling the size of the light beam passing therethrough, said housing being axially adjustable relative to said movable hollow part for concentrating the light from said bulb toward said light control means, reflecting means in said body portion for directing the light from said light source toward said objective, said movable hollow part being axially adjustable relative to said stationary hollow part for allowing said light control means to be adjusted so as to be imaged at the plane of said object when the microscope is focused upon the object, a rotatable member in said stationary hollow part having a handle extending outwardly through a slot therein for allowing a rotation of said member, and additional light control means positioned closely adjacent said reflecting means and operatively connected to said rotatable member and said stationary hollow part so as to be adjusted when said member is rotated for controlling the amount of light being directed toward said reflecting means.

16. An illuminator for use with a microscope of the character described and having a body tube, said illuminator comprising a body portion adapted to be detachably carried by said body tube and adapted to receive an objective lens system detachably secured to said body portion in optical alignment with said body tube, a rigid arm carried by said body portion, said arm comprising a stationary part and a movable part, a lamp housing carried by said movable part and containing a light bulb and condenser lens system therein, light control means carried by said movable part, said housing being axially adjustable relative to said movable part for converging the light from said bulb toward said light control means, a reflector in said body portion for directing light from said light bulb through said objective and onto a specimen or object positioned for observation through said microscope, rotatable means in said stationary part and a control arm therefor extending outwardly through a slot in said stationary part, and additional light control means adjacent said rotatable means and adjacent said reflector, said rotatable means being operatively connected to said last mentioned light control means for adjusting same for varying the amount of light reaching said reflector, said movable part being axially adjustable for allowing imaging of said first light control means at the plane of said object.

DAVID D. LOWBER.
LESLIE J. PETERS.

REFERENCES CITED

The following references are of record in the file of this patent:

UNITED STATES PATENTS

| Number | Name | Date |
|---|---|---|
| 1,637,348 | Ott | Aug. 2, 1927 |
| 1,996,920 | Hauser | Apr. 9, 1935 |
| 2,097,762 | Heine | Nov. 2, 1937 |
| 2,128,394 | Berek | Aug. 30, 1938 |